US008742892B1

(12) United States Patent
Elberbaum

(10) Patent No.: US 8,742,892 B1
(45) Date of Patent: Jun. 3, 2014

(54) METHOD AND APPARATUS FOR ASSIGNING AND IMPRINTING TOUCH ICONS OF A TOUCH PAD

(71) Applicant: Elbex Video Ltd, Tokyo (JP)

(72) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 13/952,808

(22) Filed: Jul. 29, 2013

(51) Int. Cl.
*G06F 1/16* (2006.01)
*G08B 5/22* (2006.01)
*G09F 5/02* (2006.01)

(52) U.S. Cl.
USPC ........................ 340/6.1; 361/679.02; 345/169

(58) Field of Classification Search
USPC .............. 108/28; 248/917; 710/303; 340/6.1; 345/169; 361/679.02; 379/437
See application file for complete search history.

(56) References Cited

U.S. PATENT DOCUMENTS 4,513,522 A * 4/1985 Selenke .......................... 40/638
5,897,228 A * 4/1999 Schrock ........................ 396/297
7,009,524 B2 * 3/2006 Capurso et al. ............ 340/815.4
7,639,907 B2 12/2009 Elberbaum
7,649,727 B2 1/2010 Elberbaum
7,864,500 B2 1/2011 Elberbaum
8,148,921 B2 4/2012 Elberbaum
8,170,722 B1 * 5/2012 Elberbaum .................. 700/295
8,175,463 B2 5/2012 Elberbaum
8,331,794 B2 12/2012 Elberbaum
8,331,795 B2 12/2012 Elberbaum
8,344,668 B2 1/2013 Elberbaum
2007/0046837 A1 * 3/2007 Elberbaum .................. 348/739
2011/0198460 A1 * 8/2011 Stifal et al. .................... 248/201
2011/0227510 A1 * 9/2011 Elberbaum .................. 315/363
2011/0272088 A1 * 11/2011 Cincotti ........................ 156/247

* cited by examiner

*Primary Examiner* — Brian Zimmerman
*Assistant Examiner* — Thomas McCormack
(74) *Attorney, Agent, or Firm* — Katten Muchin Rosenman LLP

(57) ABSTRACT

A method and apparatus for simplified setting and imprinting the touch icons of a touch pad used for electrical devices and appliances in homes, other residences and other building by installing the touch pad directly on walls or an electrical wall box individually and in a cascaded chain connected via a bus line with or without power feed, including the attaching of the pads to each other for providing aligned larger sized touch panel, wherein the setting of the touch icon is via loading data to a memory or via setting switches and the imprinting is selected via a program provided for printing a pre-formatted and pre-cut decorative sheet attached to the touch pad by a front cover with self-locking.

20 Claims, 9 Drawing Sheets

103
104
106
107
108
109
113
114
1-3
2-3
3-3
4-3
1-4
2-4
3-4
4-4
4L
1-6
2-6
3-6
4-6
1-7
2-7
3-7
4-7
1-8
2-8
3-8
4-8
1-9
2-9
3-9
4-9
1-13
2-13
3-13
4-13
1-14
2-14
3-14
4-14

METHOD AND APPARATUS FOR ASSIGNING AND IMPRINTING TOUCH ICONS OF A TOUCH PAD

FIELD OF INVENTION

The present invention relates to touch pads for remotely operating appliances by IR or RF signals in air, electrical signals via bus line or network and optical signals via optical cables.

BACKGROUND OF THE INVENTION

Remote control touch icons and selectors are known, such as touch selectors in elevators for selecting the destination floor. Other known touch icons for operating appliances in homes, office or other building structures, such as schools, businesses, hospitals and factories use displayed icons of black/white or color LCD displays.

Yet another known touch icons are capacitive touch icons enabling to touch a predetermined area, or surface or a specific point of a glass or plastic cover of a touch pad, normally associated with the appliance itself, for example a video interphone monitor that provides touch points onto its cover to switch on the monitor or open the entrance door to a visitor.

The known touch pads for operating and controlling different appliances in homes, offices, businesses or in any other buildings or facilities commonly use icons of LCD display. The problems such displays present are that the icons must be set to operate a given function of a given appliance, and to pre-program specific icons is very large undertaking. For example when 9 or 12 only icons need to provide for any given function of any given appliance, such task is very complex.

There is very little in common between washing machine and iPod player or between a television set and a dimmer of a light bulb. All attempts to create a cover all touch pads in the past have failed, proving time and again that a custom programmed touch pad or keypad are needed. Such custom program is also not simple, because installers of the home automation do not have the skill to handle the pads in the field, and most ending up with difficulties and the eventual reliance on special knowledgeable high level installers. This results in very high costs for both the pads themselves and the installation.

Moreover, custom programmed keypads or touch pads must be provided with descriptions termed hereafter also as icons for identifying the function of the touch point or the touch area, custom descriptions require expensive custom handling. This too complicates the introduction of cover all pads and their costs.

U.S. Pat. Nos. 7,639,907, 7,649,727, 7,864,500, 8,148,921, 8,170,722, 8,175,463, 8,331,794, 8,331,795 and 8,344,668 disclose another type of keypads, touch screen monitors, appliances and AC devices including switches and AC outlets that can be set via setting switches and/or loading addresses and data pertaining the appliance and its function by learning the appliance remote control signals from the appliance's original remote control units, in a simple process. Enabling the users themselves to decide, and set the keypads or touch pads to their preference.

The one remaining item for such pads is the need to imprint and/or otherwise describe the operating function of the designated keys, icons or the touch spot or area for identifying the nature of the key, the touch area or the icon including the appliance identification or other particulars the "touch" represents.

US patents such as U.S. Pat. Nos. 8,148,921 and 8,170,722 show windows for introducing such printed labels for each key, for self-printing/cutting by the user of his selection and preference. For example, instead of printing bed-room 2, the user can print "Joanne" or the name of the child occupying bed-room 2.

The last is the touch pad design and cost. Architects are demanding attractive designs for touch pads, little windows or cutouts for labels will be accepted for business premises and offices, but not for a living room of a residence. The demand is for clean, white and/or decorated pads that do not look too industrial in nature. LCD touch screen will do, but they are costly and require expertise to program and set. Low cost, plain clean white or decorated pads that are simple to set and imprint are needed to solve the other persisting difficult item of the present day home automation system.

SUMMARY OF THE INVENTION

It is an object of the present invention to provide a simplified method and apparatus for a self-set and imprinted touch pad in a decorative enclosure for operating different appliances directly and/or in combination with electrical relays and AC current sensing devices as disclosed in the U.S. Pat. Nos. 7,649,727 and 7,864,500.

Another object of the present invention is to operate and monitor the status of the electrical appliances via one or multi LEDs associated with each touch icon or area of the touch panel surface indicating the status or the operating mode or the control or command in process, including the response from the operated appliance or appliances.

In the following description the term load refers to an appliance such as light fixture or a water boiler that is connected between the neutral line and the live AC line via add on devices, such on-off switches or relays.

The touch pad apparatus for operating AC powered appliances and other objects of the present invention is preferably operated via a bus line but can be operated by RF, IR or via visual optical signals through IR drivers, RF driver and/or optical grid of POF (plastic optical fiber) or other fiber optic cables for communicating with add on devices comprising wired, IR, RF or optical fiber receivers including AC power relays for receiving one way operational commands to operate the electrical appliances.

The touch pad of the present invention preferably communicate two way or bidirectional signals via wired, IR, RF or optical fiber transceivers included in AC power relays and AC current sensors and/or power consumption receivers for receiving one way operational command to operate the electrical appliances and for transmitting on-off status, current drain and/or the power consumed signals from the appliances, in response to the received operational command or in response to an inquiry command (a request for status data) and/or on the basis of a change in the current drain and/or a change in the consumed power, thereby providing error free remote controlling of the electrical home appliances. Such add-on devices are disclosed in the U.S. Pat. Nos. 7,649,727, 7,864,500, 8,175,463, 8,331,794 and 8,344,668.

The solution offered by the disclosed invention, is to install the touch pad body onto a standard size wall box such as used for AC switch of AC outlet directly, or via a holder that is explained later. The touch pad includes a removable internal cover for enabling the setting or designating the touch areas via setting switches accessible through the front surface, and for covering the pad's internal parts and structures when the pad is set and ready for operating.

Another object of the present invention is the employing of common codes also termed protocols disclosed in U.S. Pat. No. 8,170,722 adapted for the entire appliances of a given system including lighting and other AC on-off operated devices and all the IR or RF activated electronic appliances, by providing a simple common table programmed for the home automation controller, which records, indexes and converts the received common codes into the codes used for any of the appliances including appliances operated by non-compatible protocols, given individual appliances located in different rooms or areas of the home, on the basis of an allotted code to a given room or area in the home, office or building and the code allotted to each individual appliance as programmed and/or set.

Further, as explained above there is an absolute need to indicate by means such as imprinting the function of each touch zone, point or area of the touch pad, hereafter referred to as "touch zone" or "icon" to provide the user with clear identification of what function the touch zone is assigned to operate, of which equipment, electrical device or appliance, hereafter and in the claims refers to as a "load" or "loads", and in which location of the premises, hereafter refers to as a "room".

The preferred solution for the imprinting of the zones by the present invention is the imprinting of a pre-cut and formatted decorative imprintable cover that is placed to cover the entire surface of the touch pad that is further covered by a transparent clear or tinted molded structure that gives the touch pad a glass appearance and a design that is pleasing.

The further objectives of the present invention is to provide a whole range of shapes and structures long and short, wide and narrow, square or rectangle, each with different number of touch zones and the provision to attach several touch pad together to appear as an enlarged panel, such as combining several touch pads to become the central control panel for the whole premises.

The term "premises" hereafter and in the claims refers to a home, a house, a residence, an office, a shop, a residential building, an office building, a school, a public building, a shopping mall, a hospital, a factory and combinations thereof.

BRIEF DESCRIPTION OF THE DRAWINGS

The foregoing and other objects and features of the present invention will become apparent from the following description of the preferred embodiments of the invention with reference to the accompanying drawings, in which.

DETAILED DESCRIPTION OF THE PREFERRED EMBODIMENT

Figures 1A, 1B:
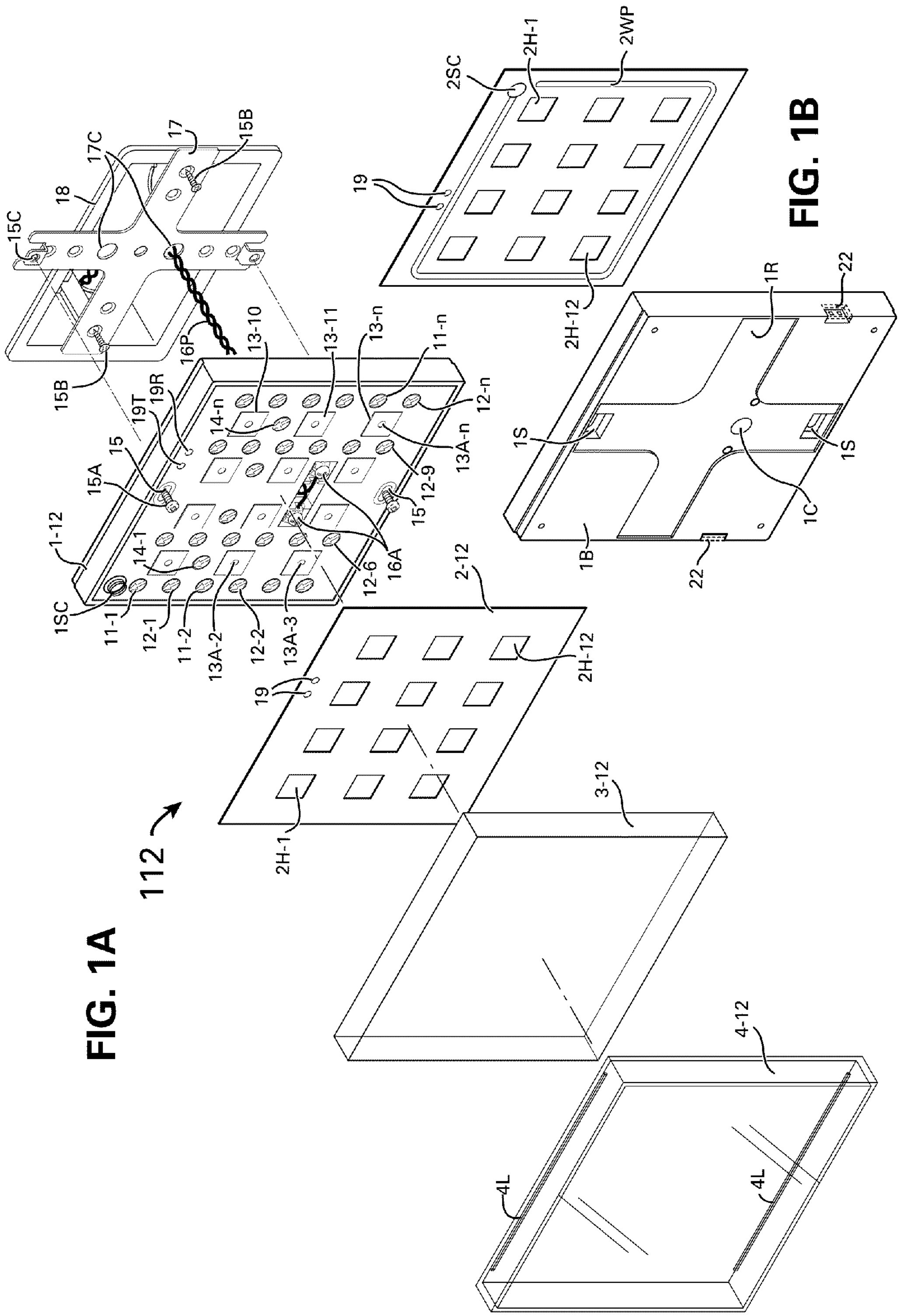
FIGS. 1A and 1B are exploded views illustrating the basic structure and elements of a touch pad of the preferred embodiment of the present invention.

FIG. 1A shows an exploded view of a touch pad 112 comprising the main body 1-12 comprising 12 touch zones. The body 1-12 is attached to a metal holder 17 that can be installed onto standard wall boxes 18 such as the standard US wall box 4"×2" or 4"×4" or onto different standard European wall boxes such as round 55 mm boxes 18R shown in FIG. 3A or different rectangular boxes, mostly similar in size and shape of the US wall box 4"×2" or directly on walls.

As shown in FIG. 1A the holder 17 is provided with many holes for attachment to a wall or to a wall box, using flat head screws shown as 15B. The holder is also provided with a tap or self-tapping cutout 15C for accommodating the two screws 15A for attaching the touch pad main body 1-12. The single shown twisted pair of wires 16P are typical AWG24 wires used in well known communication cables such as CAT5. The terminals for the twisted pair wire are accessible through an opening in the body 1-12, shown as opening 1C is the backside view 1B of FIG. 1B.

The holder thickness and the tap structures 15C are accommodated and attached to the rear body recessed surface 1R and into the two cavities 1S of FIG. 1B. With the holder 17 mounted onto the wall box 18 and the twisted pair 16P is passing through one of the cable holes 17C of the holder 17 and through the opening 1C of the main body shown in FIG. 1B is all it takes to position the main body 1-12 correctly onto the holder. Using the two screws 15A through the elongated holes 15 to lock and adjust the body 1-12 into place completes the physical installation of the body to the wall.

The main body front surface shown in FIG. 1A comprising the structured surfaces 13-1~13-*n* which are shown as twelve touch sensors, each includes a hole 13A such as the shown 13A-2, 13A-3 and 13A-n for providing optical window for the multicolor LEDs 13A-1 up to 13A-n also shown in FIGS. 6A~7B.

The touch sensors 13-1~13-*n* are constructed from a thin springy metal sheet that protrudes through the openings 2H-1 to 2H-12 of the inner cover 2-12 shown in FIG. 1A, such that when the imprintable decorative cover 3-12 is placed onto the covered surface combining the body 1-12 and the inner cover 2-12, the touch sensors 13 will be flat with the inner cover surface or protrude very slightly for enabling the front cover 4-12 to press the decorative imprintable cover 3-12 onto the touch sensors, such that no air gap can be built between the sandwiched decorative surface 3-12, the touch sensors 13-1~13-*n* and the inner surface of the front cover 4-12 when the front cover is locked onto the body 1-12 by the inner protruding ledges 4L shown in FIG. 1A, assuring the touch surfaces are operable Each touch surface 13-1~13-*n* are set to operate a function such as on-off of a light in a given room, and or to operate any function of an appliance such as volume up or volume down for controlling the TV sound level and ch. up or ch. down for selecting a cable TV station, or a terrestrial TV station.

The setting of items such as the function of a TV or the location such as the room to a given touch surface is processed via the shown rotary digital switches 11-1~11-_n_ and 12-1 to 12-_n_, with each pair 11 and 12 are providing the complete setting for each touch surface. The shown setting can be expanded by increasing the rotary setting keys to three or four per each touch surface 13. This will be explained further later.

Other setting for designating, directing and/or limiting a touch pad to a set of functions are provided via the shown up to four rotary switches 14-1~14-_n_, but the number of rotary switches 14 can be reduced or increased as needed.

Other components shown in the front of the main body 1-12 are the two terminals 16A for the non-polar twisted pair wires 16 or 16P, one wire to each terminal 16A with no polarity assignment. When connected in a cascaded chain of twisted pairs the terminals 16A will be connected to the two non-polar (in-out) twisted pairs.

The two holes 19T and 19R are the optical accesses for the IR receiver and transmitter that are discussed later and the shown spring contact 1SC is providing a contact to the frame 2WP and its contact point 2SC. The frame 2WP is a conductive frame for preventing wiping movements of hands over the touch surfaces 13 from randomly activating the touch functions.

A wiping action preventing frame 2WP is provided at the back surface of the inner cover 2-12 shown in FIG. 1B along with its contact 2SC. When the inner cover is set into place and is pressed by the sandwiched decorative cover 3 and the front cover 4 the contact 2SC of the frame 2WP engages the spring contact 1SC and will connect the wiping preventing frame 2WP to the corresponding terminal of the touch sensor IC 32 shown in FIGS. 6A~7B connected to the spring contact 2SC.

Figures 2A, 2B, 2C:
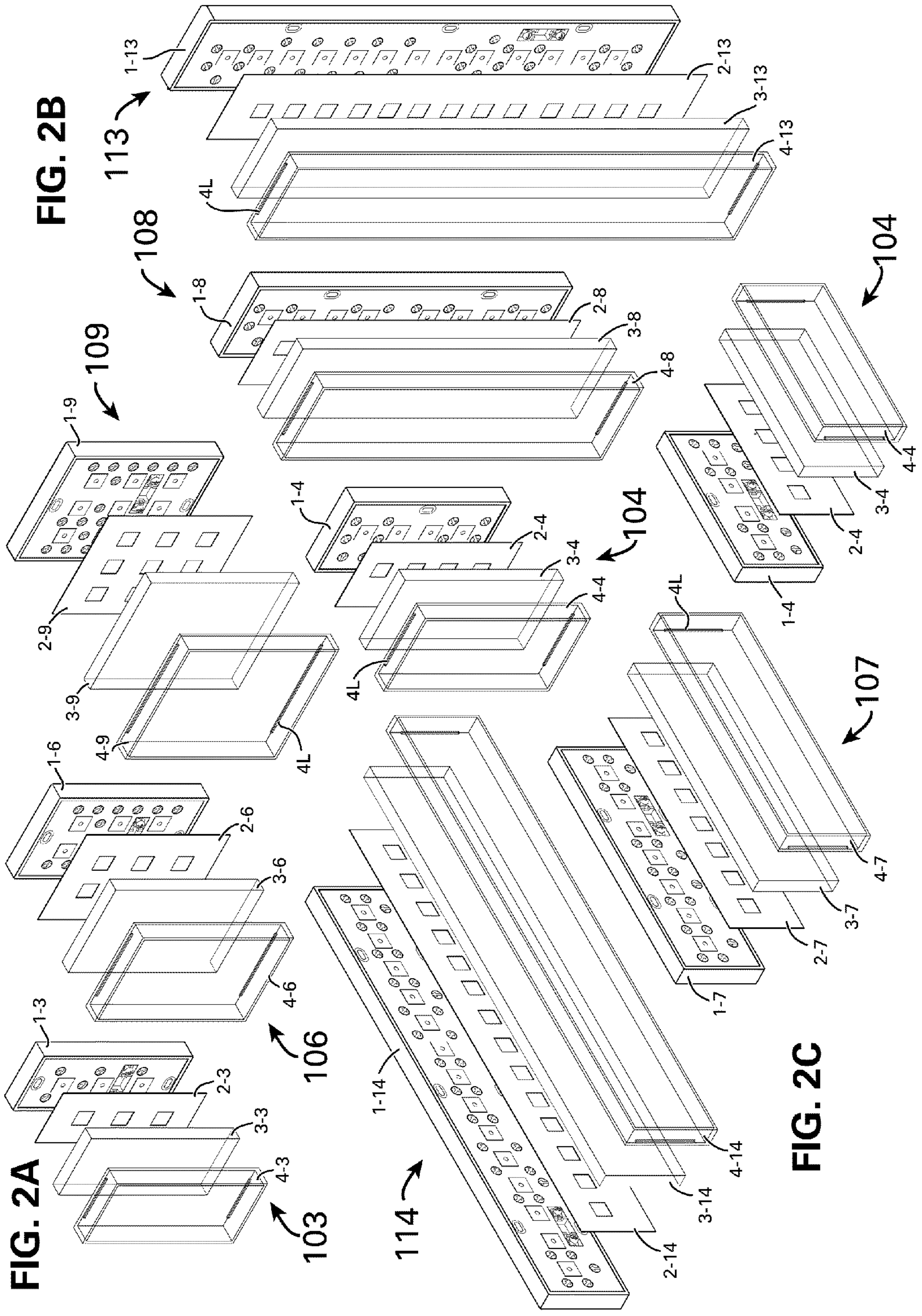
FIGS. 2A~2C are exploded views of a whole range of touch pads illustrating the many variations of sizes and shapes that apply to the touch pad of the preferred embodiment.

FIGS. 2A~2C are illustration of the many configurations of the touch pads of the present invention, structured similarly to the touch pad 112 shown in FIG. 1A. The touch pads 103, with three touch zones, the 106 with six touch zones and the 109 with nine touch zones shown in FIG. 2A are all provided with three zones height similar to the touch pad 112 and comprising the main bodies 1-3, 1-6 and 1-9, the inner covers 2-3, 2-6 and 2-9, the decoration covers 3-3, 3-6 and 3-9 and the front covers 4-3, 4-6 and 4-9. The transparent or semi-transparent front covers can be further tinted into any color to fit the architects or user choices.

FIGS. 2B and 2C illustrate a vertically and horizontally elongated touch pads, that can be mounted onto walls in vertical or horizontal orientations, shown are touch pads 104 with four touch zones, 107 with seven touch zones, 108 with eight touch zones, 113 with thirteen touch zones and 114 with fourteen touch zones. All comprising matching inner covers 2-4, 2-7, 2-8, 2-13 and 2-14, matching decorative covers 3-4, 3-7, 3-8, 3-13 and 3-14 and matching front covers 4-4, 4-7, 4-8, 4-13 and 4-14.

FIGS. 2A, 2B and 2C make it clear and obvious that many different shapes, sizes and a variety of touch zones and different number of touch zones can be provided for variety of systems in residences, schools, businesses, offices and factories alike.

As will be explained later, none of the touch pads need to be preprogrammed to a specific applications and functions. The present invention provides for self-setting and imprinting of the touch pad surfaces in a most simple manner by the users themselves, using a commonly available PC printer as will be shown further below.

Figures 3A, 3B:
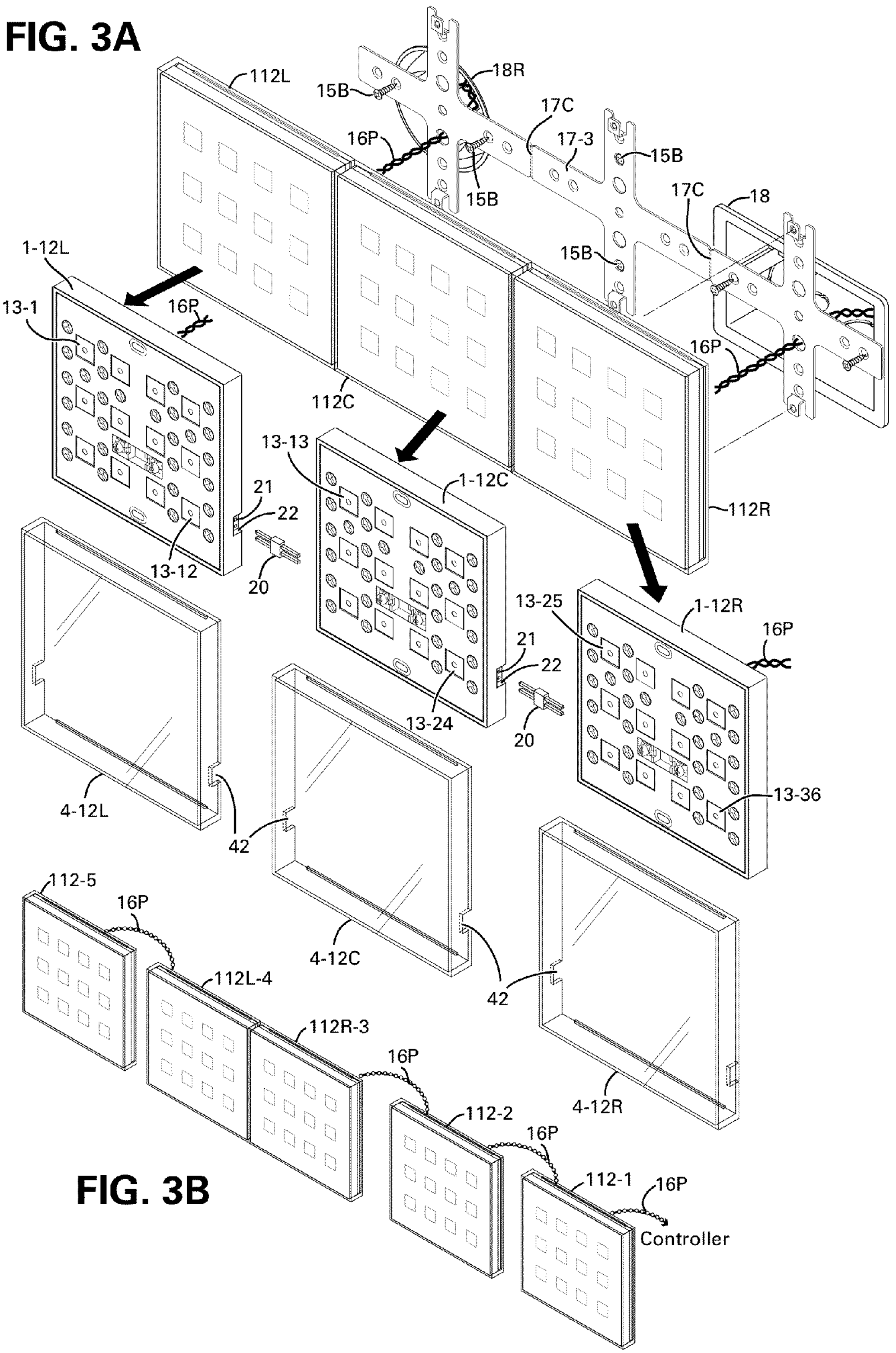
FIGS. 3A and 3B are illustrations showing the assembling and installing of plurality of touch pads shown in FIG. 1 forming a larger touch panel comprising three pads interconnected by a simple interconnecting plugs of the present invention and five touch pads connected in a cascaded chain.

FIGS. 3A and 3B illustrates another simple facilities for expanding the touch pad to cover as many functions and controls the user need or desire. This is achieved by cascading multiple touch pads be it by physical attachment for creating a large control pad or panel shown in FIG. 3A or cascaded in a chain by the non-polar twisted pair wire 16P shown in FIG. 3B as a combination of physically attached panels 112L-4 and 112R-3 connected in a cascaded chain with 112-1, 112-2 and 112-5.

FIG. 3A illustrates three touch pads 112L (left), 112C (center) and 112R (right) attached together to form 36 touch zones through an enlarge touch panel. The shown wall box 18 can be the only box for feeding the single twisted pair 16 or 16P to the three touch pad 112. The difference between the twisted pair 16 and 16P is the DC power feed and power extract of FIGS. 6A~7B.

The European wall box 18R (round) is shown to illustrate the versatility of the present invention, in which any type of wall box can be used to install one or more touch pads onto a wall and connect them via the non-polar single twisted pair 16 or 16P.

The holder 17-3 is a holder designed for attaching three touch pads 112 and many different holders are provided for variety of combinations, for a variety of vertical and/or horizontal touch pads, such as the touch pads shown in FIGS. 2A, 2B and 2C.

The holder 17-3 is similar to the holder 17 of FIG. 1A extended to precisely mount three touch pads 112, but could be for example a holder 17-2 (not shown) for mounting the two attached touch pads 112 in FIG. 3B or a longer mount 17-4 or 17-5 (not shown) for attaching four or all the five touch pads 112 of FIG. 3B.

The holder 17 can be made in a string to hold n number of touch pads such as up to 10, provided with pre-punched cutting lines for self-cutting by the installer to hold a selected number of pads. The shown holder 17-3 includes the pre-punched break or cut lines or creases 17C for providing in this instance the option to cut the holder 17-3 into three individual holders 17, shown in FIG. 1A.

The touch pad of the present invention is made to replicate a glass touch panel by providing a front cover 4 made of clear hard plastic material resembling glass. The cover may be color tinted to resemble tinted glass and it is important that when two or more square or rectangular shaped covers are attached they are precisely mounted in a straight line.

For this purpose the use of the precisely structured holders 17 such as holder 17-_n_ provide the perfect solution for installing plurality of touch pads into a perfectly aligned single large scale touch panel.

Connecting the touch pads of the present invention in a cascaded chain mandates the feeding and handling of cascade connections of the twisted pair 16 or 16P through the rear side of the touch pads. This may require additional wall boxes, or breaking of the wall surface to allow the space for the twisted pair at the back of, or near the holder. Though such work does not require high precision labor, it is known that such laboring is never clean and resulting in a damaged wall and irritations. A solution for installing plurality of wall boxes and feeding the twisted pairs via pipes is costly and labor intensive.

To make it simple, the touch pad is provided with two sockets, 21L on the left side and 21R on the right side of the main body 1 and shown in FIGS. 3A and 6A-7B for enabling a cascaded connection to be carried by a simple two pin interconnection plugs 20 shown in FIG. 3A. When the touch pads are connected to a bus line 16 and to external power feed (not shown) the sockets 21L and 21R including the interconnecting plugs 20 employed are four pin type.

The main body 1 includes a thin breakable wall, or a cutout portion 22 shown in FIGS. 1B and 3A for providing access for the plugs 20 to the touch pad. When the main unit is not cascaded by direct attachment there is no need to break the cutout portion 22 and the left or right sides of the main unit 1 remain complete with no visible cutout.

Similar cutout 42 is needed for the left or right or both sides of the front cover 4-12L (left), 4-12C (center) and 4-12R (right) shown in FIG. 3A. Such cutout are visible if not used attached as shown and it is preferable to provide front covers such as 4-12L, 4-12C and 4-12R pre-molded for given designated "attachable" touch pads.

FIG. 3B illustrates the connections of five touch pads 112 in cascaded chain via the non-polar twisted pair or bus line 16 or 16P disclosed in the many referenced US patents, for example in the U.S. Pat. No. 7,639,907, FIGS. 9A~9C, FIGS. 11A~11B, Col.13, lines 4660 and Col.16, lines 3-67, disclosing keypads and other devices connected via a cascading twisted pairs with power feed, similar to the shown connections in FIG. 3B, excluding the inline plug 20 connecting the touch pads 112-3 with 112-4, the plug is not shown but it is identical with the plugs 20 shown in FIG. 3A.

The three touch pads of FIG. 3A are shown connected to two twisted pair 16P, one to the touch pad 112-L and the other to the touch pad 112R. This dual connections is because the three cascaded touch pads are cascaded further with another touch pad, a keypad or other device such as IR driver or current receiver shown in FIG. 9 being power fed and communicating via the bus line 16P.

An important item of a cascaded chain such as the bus line 16 or 16P is the need to terminate the line at the furthest point from the controller or the bus line distributor of the home automation. In FIG. 3B the controller is connected to the touch pad 112-1 and the furthest point of the cascaded line is the touch pad 112-5. Accordingly the line must be terminated at the touch pad 112-5.

A termination of the bus line is provided via one of the setting switches 14-1~14-*n* included and shown in the touch pad 112 in FIG. 1A. One of the setting switches 14 provides for terminating the line 16 or 16P. The setting switches will be briefly discussed later as they are repeatedly disclosed in the many referenced US patents recited above.

Figure 4:
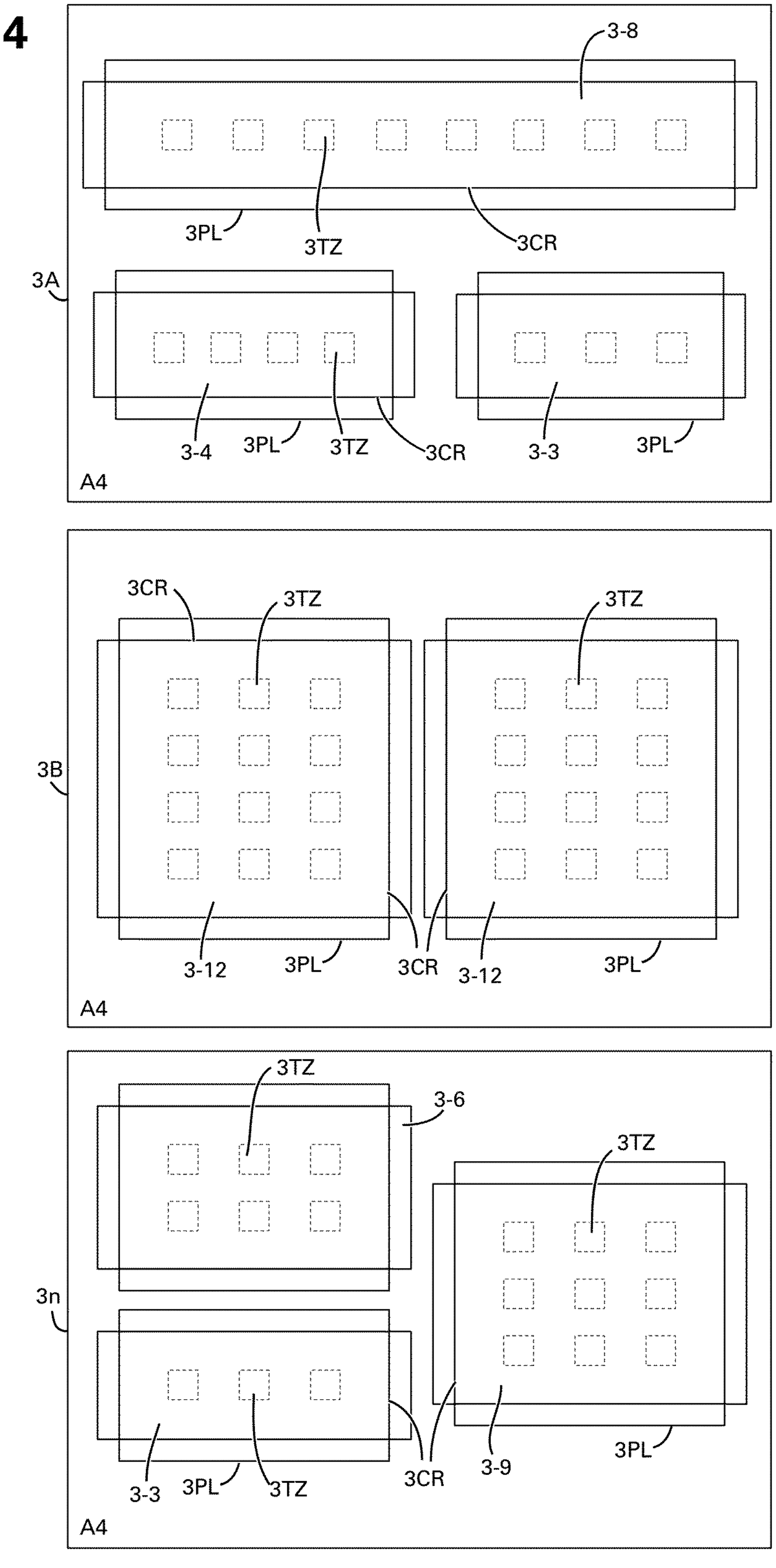
FIG. 4 is showing the decorative sheets in standard A4 printing size pre-cut and creased for a range of touch pad sizes for imprinting the touch icons.

FIG. 4 shows the pre-cut and creased decoration sheets 3A, 3B and 3*n*, the sheets are shown to be A4, which is the international size for standard PC printers throughout the world. The pre-cutting of the decoration covers such as shown 3-12 or 3-3 is incomplete and in fact it is a semi pre-cutting by keeping the pre-cut covers attached to the decoration sheet flat, including a flatten creased lines, for enabling the printing of the decorating cover via a commonly used PC printer shown in FIG. 5. A software program provided on a disc, or a download from a supplier server, introduces different fonts and decorating motifs, including color selections and font sizes to the user preference and wishes.

The program provides a selectable printing for each decorative cover type, shape or size, be it vertically or horizontally oriented, to accommodate a practical and decorative pleasing touch pad for the user selection and desire and for self-printing.

Alternatively, such design services can be provided by the distributor of the touch pads and downloaded via the network for the user self-printing and/or for printing by the touch pad distributor and delivered to the user. Furthermore, for large residential building for which the architects themselves can provide a design to cover all residences it is possible to provide a printed and pre-set touch pads by the manufacturer in strict compliance with the designed and/or contracted with the electrical system installers.

Figure 5:
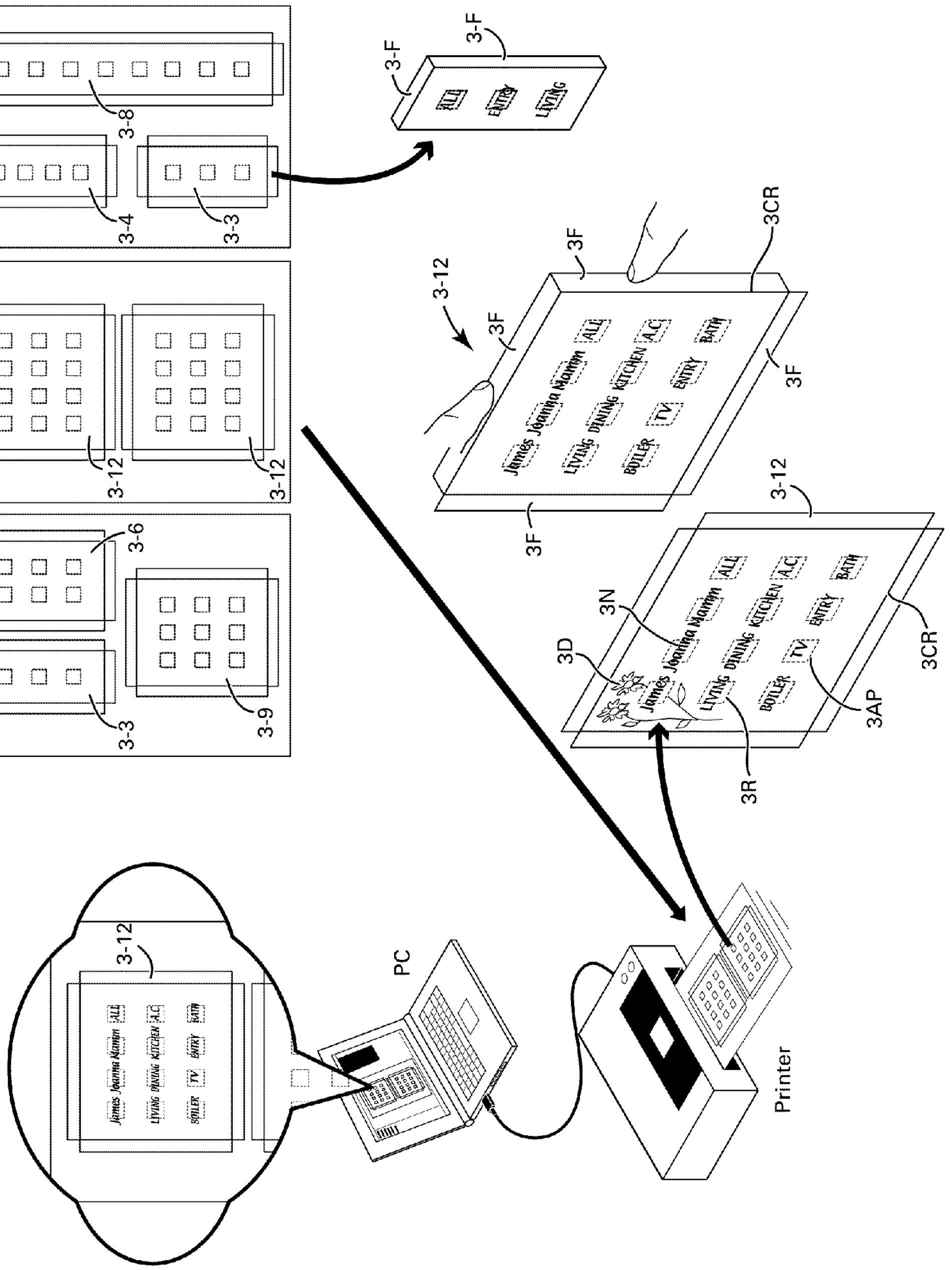
FIG. 5 illustrates the printing of the naming of the different rooms and zones of the residence including decoration motifs and images cut and folded for use with the touch pad of the present invention.
Figure 6B:
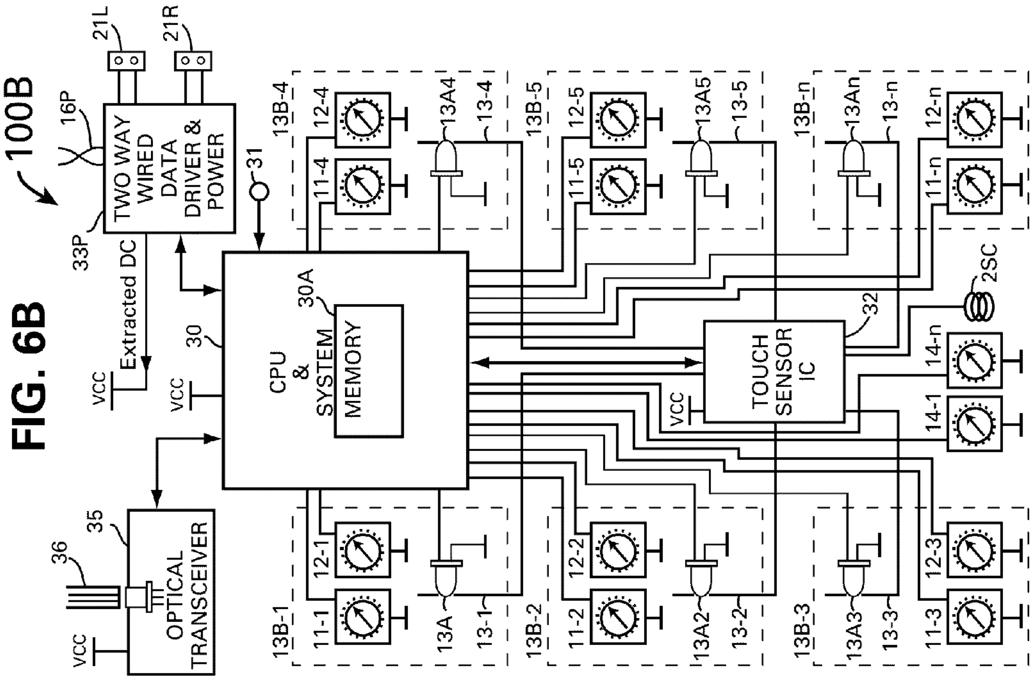
FIGS. 6A and 6B show two variations of electrical block diagrams of the touch pads of the present invention.
Figure 6A:
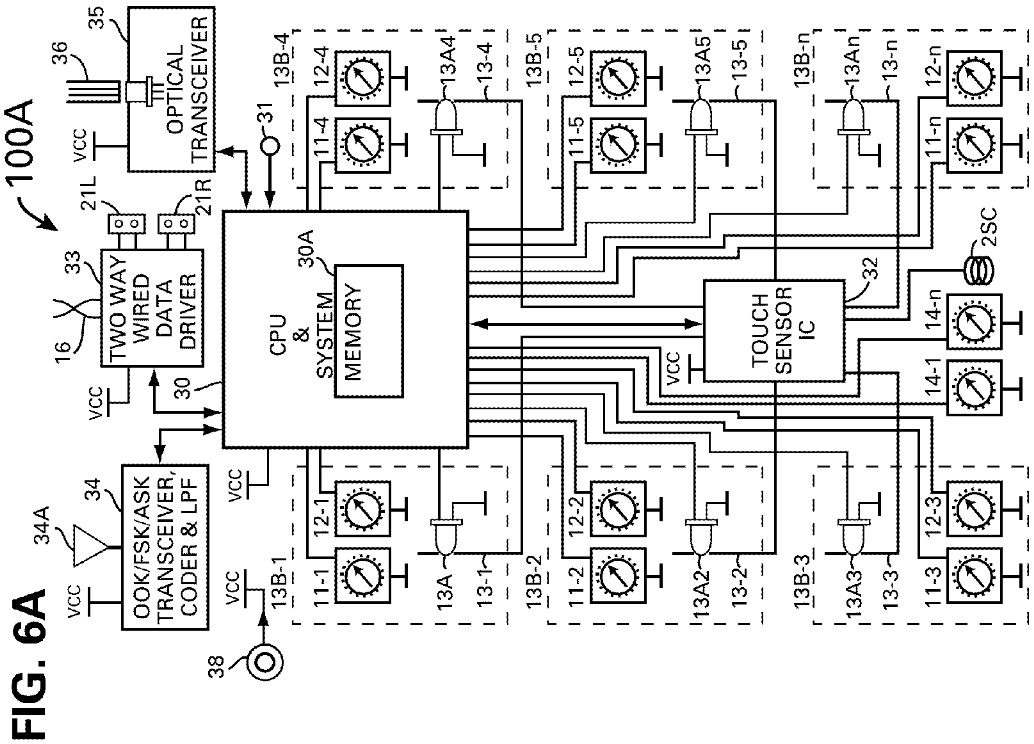
Figure 7B:
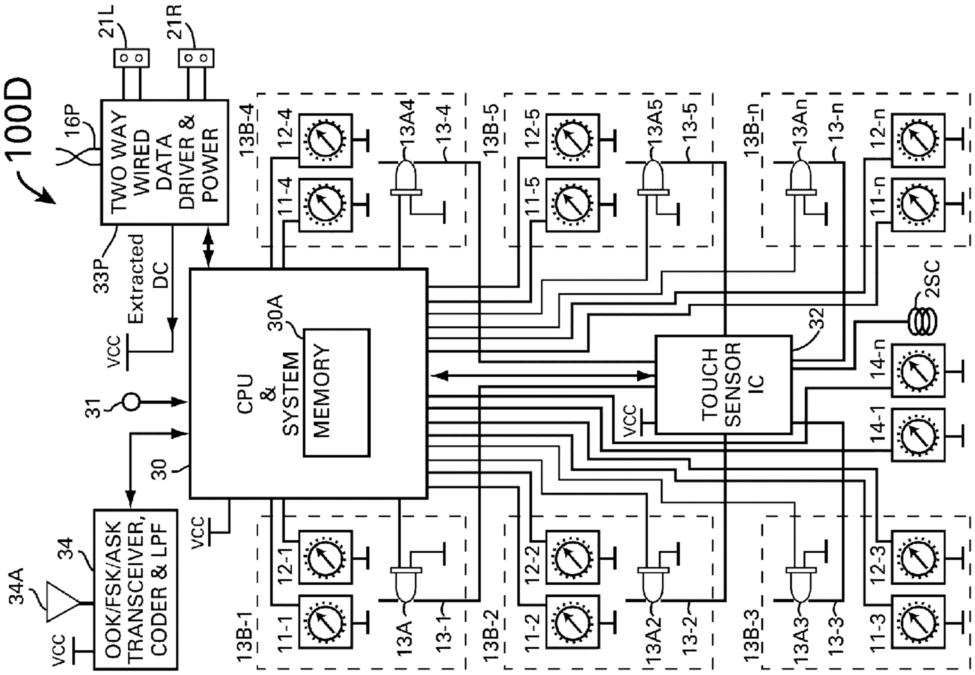
FIGS. 7A and 7B are other two variations of electrical block diagrams illustrating many circuits variation provided by the preferred embodiments of the present invention.
Figure 7A:
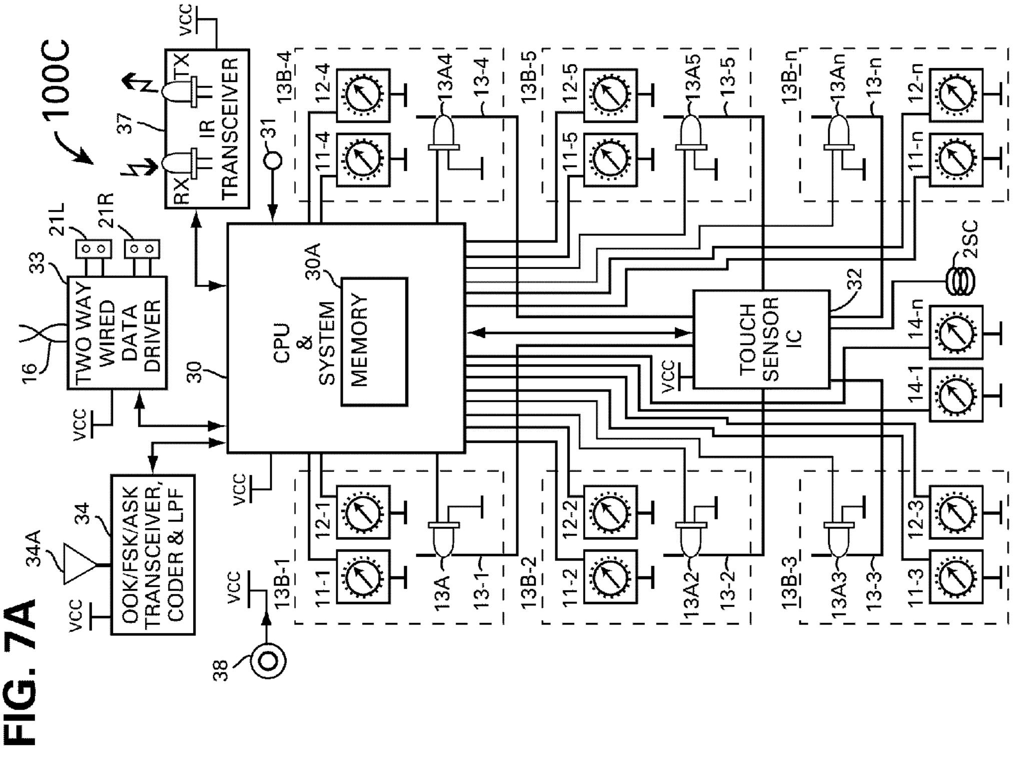

FIG. 5 shows the printing and folding process of the creased sides 3F after the separation of the imprinted pre-cut decorative covers in their different sizes shown as 3-12 and 3-3 including the creased line 3CR, the printing of names 3N, the room identification 3R, the appliances 3AP and the design motif shown as 3D.

It should also be obvious that the designation of the touch zones can be simple and accommodating any practical need for the user's desire and system configuration. The structures of the main body 1, the inner cover 2, the decorative cover 3 and the front cover 4 that is the touch surfaces are easy to install and connect and be imprinted in self-selected fonts and design motives, many of which can be provided.

The touch pads shown in FIGS. 6A, 6B, 7A and 7B employ essentially the same circuits employed for all the other devices of home automation system operated by the present invention such as current receivers, IR drivers, RF gateways and keypad. The CPU 30 is shown with the system memory 30A inside the CPU, however the CPU 30 and the memory 30A of FIGS. 6A~7B can be separated memory device 30A and CPU 30, similar to the other devices such as IR drivers, keypads, command converters and gateways.

Figure 9:
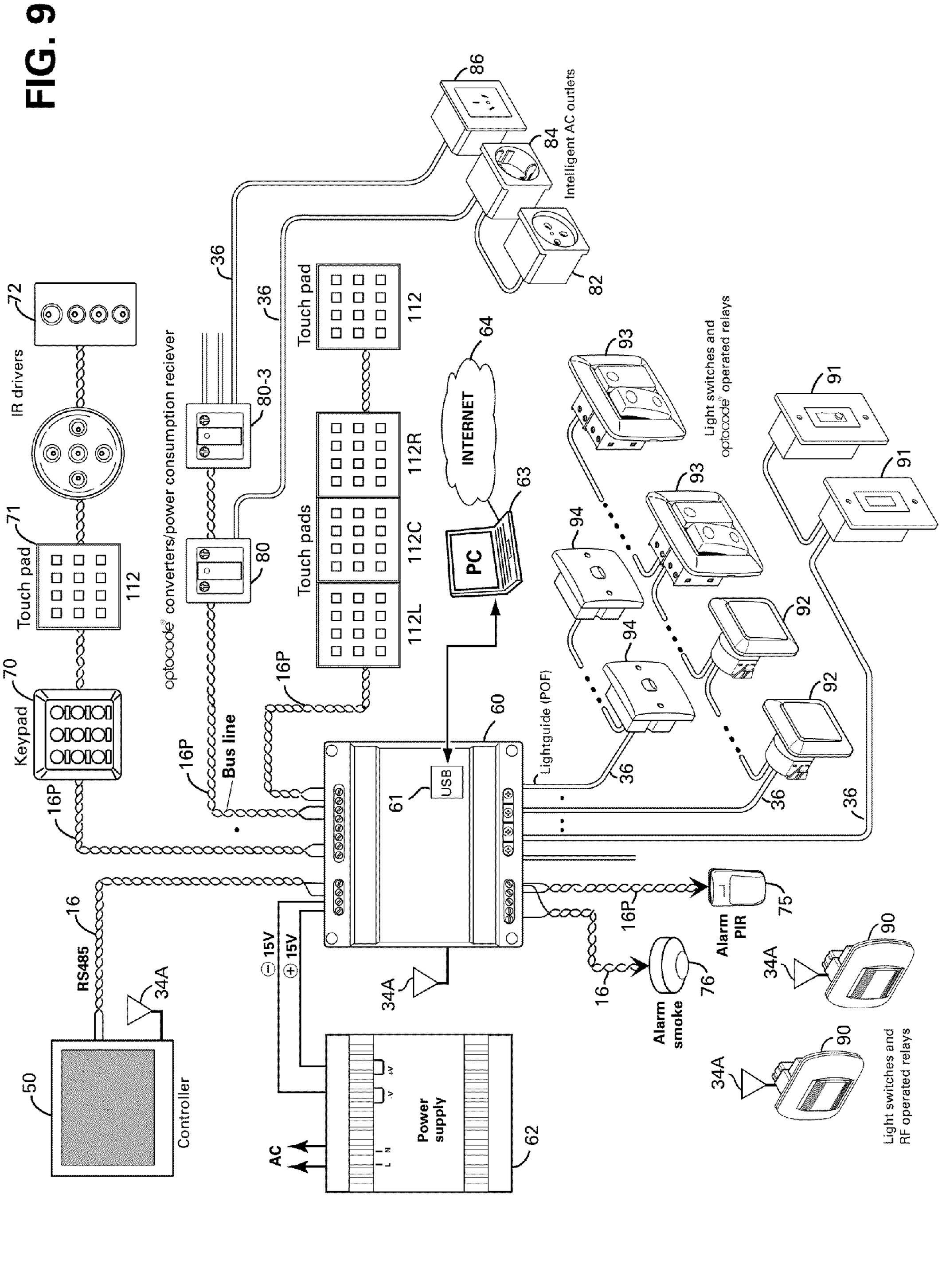
FIG. 9 is a block diagram of a home automation system including the touch pads of the present invention connected in a cascaded chain of a bus line with power feed.

The digital rotary switches 11-1~11-*n*, 12-1~12-*n*, the circuits 33 for the wired network 16, the circuit 33P for the wired network and power extract 16P, the circuit 37 for the IR transceiver, the circuit 35 for the optical transceiver for exchanging its optical signals via lightguide or POF 36 and the circuit 34 for the RF transceiver including the antenna 34A are similar circuits to the circuits of the intelligent AC outlets, the IR drivers, the power consumption receivers, the RF gateways shown in FIG. 9 including circuit of devices such as motion detectors, magnetic switch, humidity and temperature sensors and control and others disclosed in the referenced US patents.

The antenna 34A of the RF transceiver is not visible as it is structured as a conductive pattern of the PCB (printed circuit board) of the touch pad. The well known touch sensor IC 32 is used for all the touch pads 100A-D shown in FIGS. 6A~7B.

Each of the shown touch pads 100A, 100B, 100C or 100D may incorporate a specific circuit for a given network such a circuit 33 for wired network 16, circuit 33P for wired network 16P with power extractor, circuit 34 for wireless RF network, circuit 37 for IR network and circuit 35 for fiber optic network. However the touch pads 100A~100D may include all the four circuits into single touch pad for providing a common or a universal touch pad 100 communicating via any of the networks and powered through the network or by a battery or by an external power supply connected to terminal 38 or by a built-in power supply (not shown).

The individual touch pads or the combined touch panels of FIGS. 3A and 3B are in essence an array of touch zones and indicators for mounting onto standard electrical boxes, such as the shown wall box 18 or 18R in FIG. 3A, or directly on walls, or incorporated into a table top case (not shown), powered for example by a battery for communicating via IR in line of sight with appliances similar to a common IR remote control device.

Several touch pads can be installed for example in kitchens, dining room, entrance and main bedroom etc, or in main entrance of an office and/or in the manager room of an office. The basic touch functions are to switch on and off lights and appliances in the home, apartment, office or building, and indicate the lights or the appliances on and off status.

For this reason the preferred embodiment of the present invention uses the two or n digital rotary switches 11-1~11-*n* and 12-1~12-*n* shown in FIGS. 1A, 6A~7B for assigning address (room), appliance and/or function and combinations thereof to each individual touch zone, enabling the user to select which touch zone will operate and monitor via its indicator 13A the given appliance status and operating function.

Each shown touch zone 13 in FIGS. 1A, 6A, 6B, 7A and 7B is grouped into a box, shown as a dashed line box 13B, containing indicator 13A and the two or n digital switches 11-1~12-*n*. As explained above, the digital switches 11 and 12 shown as rotary switches, are the preferred embodiment of the present invention, because they provide for a simple assignment, by the user, of each touch zone also referred to as icon to a given room, appliance, function and combinations thereof.

However any number or type of digital, binary and other switches including well known DIP switches can be used. Similarly an address (room) and the other setting can be specifically programmed and set by installing the given specific program into the memory 30A of the CPU 30 via the home automation controller, the video interphone or the shopping terminal 50 shown in FIG. 9, via RF or IR in air, optical signal via optical cable (POF) or directly from a PC incorporating the specific given program for installing the touch zones functions and appliances particulars to the memory 30A through the CPU 30 via the port 31 shown in FIGS. 6A~7B or via a USB port 61 included in the home automation distributor 60 shown in FIG. 9.

Figure 8A:
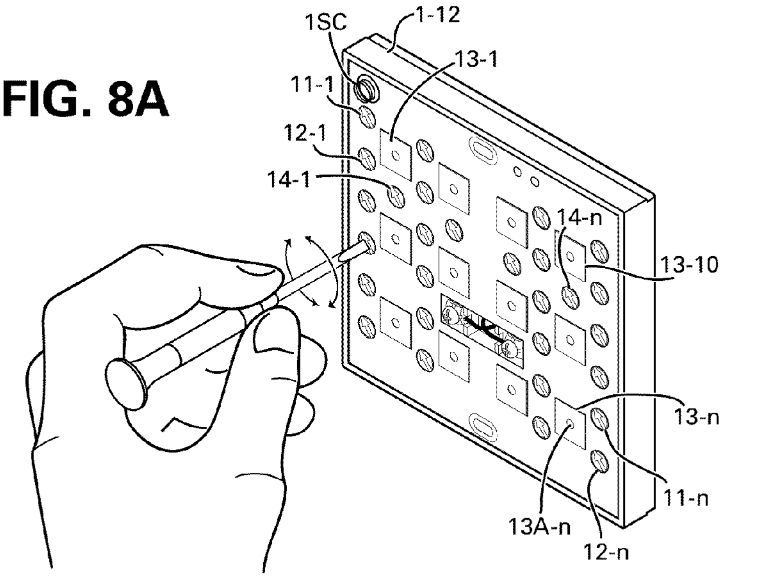
FIGS. 8A and 8B are illustrations showing the setting process of the touch zones and the touch pad via the rotary digital switches of the preferred embodiment of the present invention.

FIG. 8A illustrates the setting process of the setting switches 11, and 14. The digital rotary switches are set for each touch surface 13-1~13-*n* by rotating each of the switches to a selected position as needed or desired by the user.

Figure 8B:
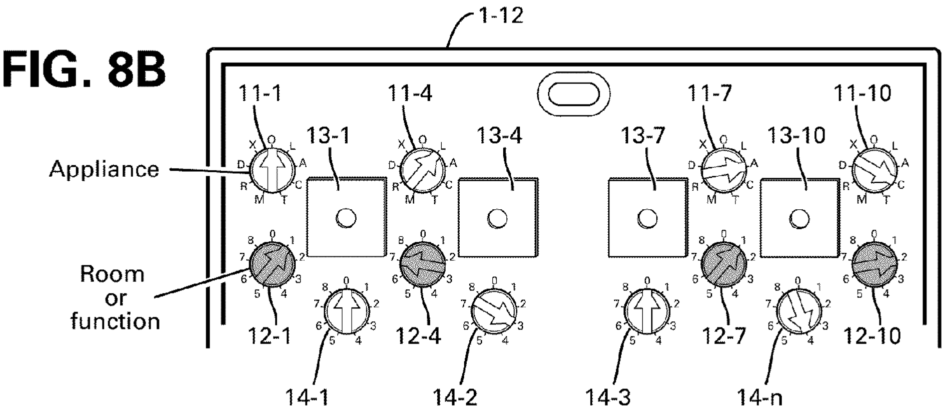
Figure 8C:
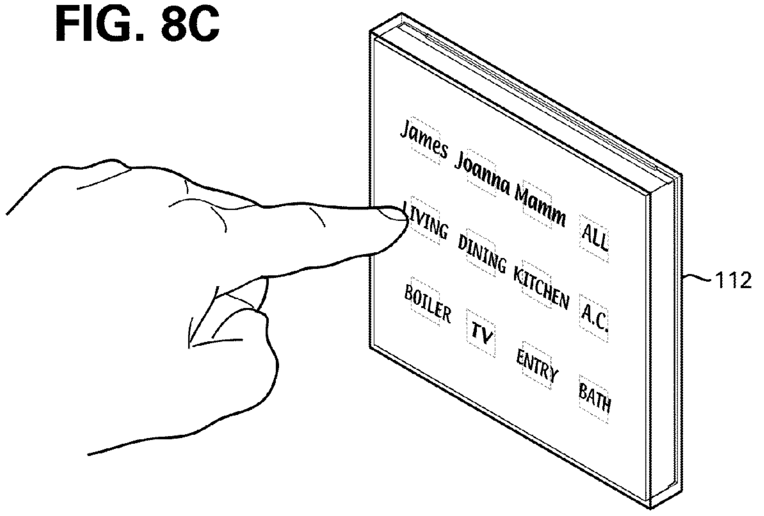
FIG. 8C is an illustration showing the touching of a set and imprinted touch pad of the present invention.

FIG. 8B shows a detailed view of the two digital rotary switches 11 and 12, wherein the switches 11 select the appliance to be controlled or operated. Each rotary switch 11 is shown to provide for the selection of: L—light, A—Air condition, C—Curtains, blinds or shutters, T—Television, M—Music, R—Radio, D—DVD or any other video recorder, X—Auxiliary and O—special setting.

The switch 12 is providing for the selection of a room or a function: In room mode the numerics 1~8 represent 1-8 rooms and O represent the common area of the residence, with water boiler, for example, is programmed to be in the common area.

In function mode the numeric 1~8 and O represent different functions for different appliances, such as setting for example the switch 12 to position 1 will in most cases switch the appliance power on-off, for curtains position 1 will be a command to close a curtain 1.

As many different functions are programmed, including for example positions 3 and 4 volume up and volume down for A/V appliances, or temp up and temp down for air conditioner and similar. Accordingly, the touch pad is supplied with look up table and an illustrated manual for instructing the setting of many functions for different commonly used appliance.

The rotary digital setting switches 14-1~14-*n* are set switches for designating the overall function of the touch pad. For example, setting the touch pad for operating the different functions of the appliances and electrical devices only in the room where the pad is installed (appliance mode), or for setting the pad to switch appliances and electrical devices including lighting on-off (only) in any of the rooms (room mode).

Other setting includes the limiting or expanding the number of, for example, lights or curtains in a given room. Another switch 14 is used for terminating or non-terminating the line 16 or 16P. Yet, the same digital switch or another setting switch 14 is dedicated to set the self-address (the room of which the pad is installed) and the directing/limiting the propagation of given signals in a given room.

The above and similar or specific settings can be provided as disclosed in the referenced US patents, and it should become obviously clear that the touch pad of the present invention can be set and be imprinted by the user and that the touch pad is simple to install, set and operate.

FIG. 9 shows a system illustrative diagram comprising the system controller 50 that commonly uses touch screen display of a dedicated home automation controller, a video interphone monitor or a shopping terminal display recited repeatedly in the referenced US patents. FIG. 9 further shows a power supply 62 for powering the system, a bus line distributor 60 that is shown connected to a plurality of cascading bus lines 16P and cascading optocode lines via the plastic optical fiber (POF) known also as lightguide to a range of AC relays and switching devices 91, 92, 93 and 94.

The cascading bus lines 16P is shown connected to a keypad 70, the touch pad 112, 112L, 112C and 112R, an optocode converter/AC power consumption receivers 80 and 80-3 that are linked to an intelligent AC power outlet 82, 84 and 86 via POF cables 36 for reporting the power consumed through the AC outlets via the bus line distributor 60 to the controller 50 and through a USB connector 61 to a PC 63 direct or via a router (not shown) and through the internet 64 to outside the premises, including to mobiles such as iPhone or Android (not shown) or iPad devices.

The system propagates bidirectional IR command and response signals via the touch pad 112 and the IR drivers 71 and 72, and bidirectional RF signals via the controller 50, the bus line distributor 60, the touch pads 112, or via RF gateway (not shown).

The alarm system shown includes a PIR (motion detector) 75 connected to the distributor 60 via a bus line 16P with power feed and a smoke detector 76 connected via a bus line 16 with no power feed. The light switches 90 are shown operated via RF antenna 34A directly from the touch pad 112 or via the RF gateway (not shown) or via the RF communicating controller 50 or the distributor 60.

It is clear from the explanations above, that the touch pads 103, 104, 106, 107, 108, 109, 112, 113 and 114 of the present invention provide a simple method and apparatus for conveniently operating home automation comprising manual switches with relays, intelligent AC outlets, keypads, distributed networks including IR, RF, optical and electrical signal for controlling appliances in any of the room or the common area of a home, an office or a building.

The touch pad and the system offer a simple low cost local and remote operation including power consumption and status reporting, be it via the video interphone system, the shopping terminal network or via a similar home automation controller. It is also clear that the present invention provides for remote operation of the home automation via the internet 64, using PC 63 and/or mobiles (not shown) and can receive updated status from the system locally via the touch pad indicators, or through the video interphone or the shopping terminals display, and remotely through a PC or mobile devices.

The indicator 13A shown in each touch surface 13 in FIG. 1A and each block 13B of FIGS. 6A~7B can be multi-color LED indicator such as the well known red-green-orange or blue-violet-red LEDs. The indicators can be programmed, for example, to flash green when command is processed, or flashed red to indicate no response, light green to show appliance is on, red for appliance is off and yellow, for example, that the appliance is in a standby mode, or that a thermostat is activated.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the scope of the invention.

What is claimed is:

1. A method for imprinting touch icons for identifying a plurality of touch positions aligned with touch sensors of a touch pad, each touch sensor is assigned to operate at least one of a function of a given electrical appliance, said touch pad comprising a printable decorative sheet formatted with creased lines to form an inner cover, one of a transparent and semi-transparent front cover with locking ledges for covering and attaching said inner cover to a sensing surface of a main body of said touch pad by said locking ledges leaving no air gaps between said front cover, said inner cover and said sensors, said method comprising the steps of:

a. selecting at least one of names and design motifs for at least one touch icon through a PC printing program associated with said touch pad;
b. printing the selected names and design motifs by a PC printer onto said decorative inner cover;
c. bending the creased lines and fitting the printed decorative inner cover onto said main body; and
d. attaching firmly said printed decorative inner cover flat to said sensing surface by said front cover and said locking ledges to said main body with no said air gaps and no adhesive.

2. The method according to claim 1, wherein said touch pad further comprising a CPU, a memory, touch sensing circuit, plurality of indicators, a port for data loading, plurality of setting switches, at least one communication circuit selected from a group comprising electrical signals via bus line, electrical signals via bus line with power feed, RF signals in air, IR signals via line of sight, optical signals via optical cables and combinations thereof and wherein a power for operating said touch pad is selected from a group comprising said bus line with power feed, a battery, an external power supply and a built-in power supply, said method further comprising the step of;

a. assigning each touch sensor to communicate a command of a given function of a given load in a given room of said premises via one of said data loading to said memory and said setting switches.

3. The method according to claim 2, wherein said at least one of said electrical signal and said power feed via said bus line are connected to said touch pad with no polarity designations.

4. The method according to claim 3, wherein a plurality of said touch pads can be connected in a cascaded chain via one of said bus line, said bus line with power feed and said optical cables.

5. The method according to claim 4, wherein said touch pads further comprising dual in line connectors on two opposing sides of said main body covered by a removable cutout portion for enabling the physical attachment of at least two said touch pads via a linking complementary connector into an extended and aligned touch panel, and wherein each said front cover of each attached pad is provided with a pre-cut portion complementary to a removed said cutout of said main body.

6. The method according to claim 1, wherein a rear side of said main body includes recesses for accommodating a holder structured for attachment onto one of walls and different electrical wall boxes and for attaching said main body flat onto said wall through said holder with adjustments via elongated screw holes.

7. The method according to claim 6, wherein said holder is structured in a string with pre-punched cut positions for attaching n touch pads into an extended aligned touch panel.

8. The method according to claim 2, wherein each of said touch positions is associated with at least one LED indicator for indicating a status of at least one of the given function of the given load in the given room by an indication selected from a group comprising continuous, flashing at a given rate, flashing at a slower rate, flashing at a higher rate, a continuous color, a change in color, rotating colors and combinations thereof.

9. The method according to claim 2, wherein said at least one touch sensor is assigned by at least two of said setting switches with one of said switches assigns said one touch sensor to one of a room and a function and the other setting switch to a load.

10. The method according to claim 2, wherein said touch pad further comprising at least two setting switches for setting the mode and functionality of said touch pad with one setting switch assigns the touch pad to a given room of said premises and the other setting switch sets the touch pad to a mode and functionality selected from a group comprising a load mode for operating loads and their functions within the assigned room, a room mode for switching on-off any load in any room of the premises; and wherein a third setting switch selects at least one of the number of a given loads in a given room and the propagation of at least one of IR and RF signals within the given room including the bus line termination and combinations thereof.

11. A touch pad with a printable decorative sheet formatted with creased lines to form an inner cover of said touch pad for introducing at least one of touch icons and design motifs between one of a transparent and semitransparent front cover and a sensing surface of a main body of said touch pad, said decorative sheet is imprinted by a PC printer using a printing program associated with said touch pad for identifying a plurality of touch positions aligned with touch sensors, the imprinted decorative sheet is folded into an inner cover along said creased lines made to fit the size of said sensing surface and said main body; and said front cover including ledges for attaching firmly the folded inner cover flat onto said sensing surface by locking said ledges to said main body leaving no air gaps between said front cover, said inner cover and said sensors and with no adhesive for enabling to operate at least one function of at least one of electrical appliance and electrical device via at least one imprinted touch icon.

12. The touch pad according to claim 11, further comprising a CPU, a memory, touch sensing circuit, plurality of indicators, a port for data loading, plurality of setting switches and at least one communication circuit selected from a group comprising electrical signals via bus line, electrical signals via bus line with power feed, RF signals in air, IR signals via line of sight, optical signals via optical cables and combinations thereof;

a power for operating said touch pad is selected from a group comprising said bus line with power feed, a battery, an external power supply and a built-in power supply, and wherein at least one of said touch sensors is assigned to generate and communicate a command of a given function of a given load in a given room of said premises.

13. The touch pad according to claim 12, wherein said at least one of said electrical signal and said power feed via said bus line are connected to said touch pad with no polarity designations.

14. The touch pad according to claim 13, wherein a plurality of said touch pads can be connected in a cascaded chain via one of said bus line, said bus line with power feed and said optical cables.

15. The touch pad according to claim 14, wherein said touch pads further comprising dual in line connectors on two opposing sides of said main body covered by a removable cutout portion for enabling the physical attachment of at least two said touch pads via a linking complementary connector into an extended and aligned touch panel, and wherein each said front cover of each attached pad is provided with a pre-cut portion complementary to a removed said cutout of said main body.

16. The touch pad according to claim 11, wherein a rear side of said main body includes recesses for accommodating a holder structured for attachment onto one of walls and different electrical wall boxes and for attaching said main body flat onto said wall through said holder with adjustments via elongated screw holes.

17. The touch pad according to claim 16, wherein said holder is structured in a string with pre-punched cut positions for attaching n touch pads into an extended aligned touch panel.

18. The touch pad according to claim 12, wherein each of said touch positions is associated with at least one LED indicator for indicating a status of at least one of the given function of the given load in the given room by an indication selected from a group comprising continuous, flashing at a given rate, flashing at a slower rate, flashing at a higher rate, a continuous color, a change in color, rotating colors and combinations thereof.

19. The touch pad according to claim 12, wherein said at least one touch sensors is assigned by at least two of said setting switches with one of said switches assigns said one touch sensor to one of a room and a function and the other setting switch to a load.

20. The touch pad according to claim 12, wherein said touch pad further comprising at least two setting switches for setting the mode and functionality of said touch pad with one setting switch assigns the touch pad to a given room of said premises and the other setting switch sets the touch pad to a mode and functionality selected from a group comprising a load mode for operating loads and their functions within the assigned room, a room mode for switching on-off any load in any room of the premises and wherein a third setting switch selects at least one of the number of a given loads in a given room and the propagation of at least one of IR and RF signals within the given room including the bus line termination and combinations thereof.

* * * * *